United States Patent
Oten et al.

[15] 3,686,300
[45] Aug. 22, 1972

[54] PROCESS FOR THE PREPARATION OF P-TOLUENESULFOCHLORIDE

[72] Inventors: Joachim Oten; Georg Schaeffer, both of Farbwerke Hoechst AG, Frankfurt/Main, Germany

[22] Filed: March 11, 1970

[21] Appl. No.: 18,761

[30] Foreign Application Priority Data

March 14, 1970  Germany..........P 19 12 956.7

[52] U.S. Cl. ............................................260/543 R
[51] Int. Cl................................................C07c 51/58
[58] Field of Search..................................260/543 R

[56] References Cited

OTHER PUBLICATIONS

Zhurnal Prikladnoi Khimii 29, 1299 (1956)

*Primary Examiner*—Lorraine A. Weinberger
*Assistant Examiner*—Richard D. Kelly
*Attorney*—Connolly and Hutz

[57] ABSTRACT

Improved process for the preparation of p-toluenesulfochloride, wherein for each mol of toluene about 1 – 2 mols of chlorosulfonic acid and about 0.1 – 1 mol of an alkali metal-, alkaline-earth metal- or ammonium salt are placed in a reaction vessel, Toluene is added thereto and after reacting at 60° – 90° C the mixture is cooled to about 30° – 40° C, a further amount of chlorosulfonic acid (at least 1 mol per each mol of toluene) is added and the reaction mixture is treated to form p-toluenesulfochloride. In comparison with known processes the instant process has the great advantage that the p-toluenesulfochloride is obtained in a much higher yield.

4 Claims, No Drawings

PROCESS FOR THE PREPARATION OF P-TOLUENESULFOCHLORIDE

The present invention is concerned with a process for the preparation of p-toluenesulfochloride by reacting toluene with chlorosulfonic acid in the presence of salts.

As is well known, p-toluenesulfochloride is prepared by sulfonating, at 100° C, toluene with sulfuric acid, separating the resulting mixture of o- and p-toluenesulfonic acid and, subsequently, chlorinating the p-toluenesulfonic acid with chlorosulfonic acid, phosphorus trichloride or similar chlorinating agents.

According to another known process toluene is allowed to run into strongly cooled chlorosulfonic acid used in excess, following which the reaction mixture is poured onto ice. In said process there are obtained, simultaneously, o- and p-toluenesulfo-chloride which must be separated subsequently thereto.

German Pat. Specification No. 1 172 258 discloses a continuous process for the preparation of toluene-sulfonic acid chlorides providing a mixture of toluenesulfochloride-isomers in a yield of 89 percent of the theory in which the portion of para chloride is about 69 percent. In order to obtain the para compound, an enrichment would be required for isolation thereof which would involve considerable loss and technical expenditure.

In German Pat. Specification No. 1 112 978 a process is proposed providing pure p-toluene-sulfochloride with a melting point of from 64° to 65° C wherein toluene is sulfonated in several steps using fuming sulfuric acid and the water produced in removed with chlorosulfonic acid. Finally, p-toluenesulfochloride form with the chlorosulfonic acid and is isolated, after pouring onto ice, by centrifugation.

The yield said process provides does not amount to 80 percent, but 73 percent of raw p-toluenesulfochloride.

Furthermore, the process is complicated technically. According to older works described in literature the reaction of toluene with chlorosulfonic acid carried out at elevated temperature yields a toluenesulfochloride having an advantageous ratio of para- to ortho-isomers (cf. Harding, J. of Chem. Society 119, 1264 (1921). However, no references as to the yields obtained are stated. On duplicating the process, it showed that major amounts of high-boiling products are formed therein.

According to a further known process (cf. Zhurnal Prikladnoi Khimii 29, 1299 (1956)) the addition of sodium sulfate in the preparation of p-toluenesulfochloride from toluene and chlorosulfonic acid has a favorable effect. According to the latter process 3 mols of chlorosulfonic acid and 0.5 mols of sodium sulfate are admitted into the reaction vessel and one mol of toluene is added dropwise thereto at 60° – 70° C. The reaction mixture is decomposed by means of ice and the product isolated on the suction filter. After drying in the air, there are obtained, in the most favorable case, with an amount of 100 g of toluene used, about 160 g of raw product which calculated on toluenesulfochloride corresponds to a yield of 77 percent of the theory. On distilling the raw product, after it has been taken up in an organic solvent and after drying, 133 g of a distillate with a solidification point between 58° and 59° C are obtained at a yield of 64 percent of the theory. The portion of the para compound is 82 – 85 percent.

The theoretical yield in pure toluenesulfochloride amounts to 53 –54 percent of the theory.

Now, it has been found that p-toluenesulfochloride of high purity is obtained at an elevated yield by reaction of toluene and chlorosulfonic acid in the presence of salts, when for each mol of toluene about 1 – 2 mols of chlorosulfonic acid and about 0.1 – 1 mol of an alkali metal-, alkaline-earth metal- or ammonium salt are placed into the reaction vessel, toluene is added thereto, and, after reacting at 60° – 90° C, the mixture is cooled to about 30° – 40° C, a further amount of chlorosulfonic acid (at least 1 mol per each mol of toluene) is added and the whole is, subsequently, reacted to yield toluenesulfochloride.

The process is so conducted that in the first reaction step about half of the amount of chlorosulfonic acid totally required is admitted into the reaction vessel along with an alkali metal-, alkaline-earth metal- or ammonium salt, toluene is dropwise added at 60° – 90° C and in the second reaction step, after cooling the batch to about 30° C, the remaining amount of chlorosulfonic acid is introduced. In the first reaction step about one to two, preferably 1.5 mols of chlorosulfonic acid are used, in the second 1 to 2 mols, preferably 1.5 mols of chlorosulfonic acid are employed.

As alkali metal-, alkaline-earth metal- or ammonium salt, for example, potassium-, sodium- or ammonium sulfate or chloride or mixtures of said salts are used. Per each mol of toluene, for example, 0.1 – 0.25, preferably 0.2 mol of a sulfate or 0.2 – 0.5, preferably 0.4 mol, of a chloride is employed.

The optimum period required for the first reaction step wherein the toluene is sulfonated, however, concurrently therewith, p-toluene-sulfochloride forms already, depends on the salt employed, while with sodium sulfate, at 75° C, a toluene-sulfochloride with a high percentage of para compound is obtained, with use of potassium chloride a reaction temperature of 90° C is needed for preparing a corresponding product.

Excessive reaction temperatures cause side reactions and formation of high-boiling products the portion of which amounts in the instant process to about 1 percent. With lower reaction temperatures the yield in toluenesulfochloride slightly rises, however, at the same time, also the portion of o-toluenesulfochloride augments.

The instantly-claimed process is, for example, performed in such a manner that for each mol of toluene 1.5 mols of chlorosulfonic acid are introduced and, while stirring, 0.2 mol of an alkali metal sulfate or 0.4 mol of an alkali metal chloride is added in several portions, whereby the solution warms. Moreover, the addition of a chloride results in the formation of hydrogen chloride. Subsequently, at about 80° C and while stirring, one mol of toluene is dropwise introduced within about 3 hours, the reaction mixture is cooled to 30° C at which temperature 1.5 mols of chlorosulfonic acid are admitted into the reaction mixture which is then stirred for another hour. Work up is effected in usual manner by pouring onto ice. The precipitated, solid product remains, after decanting of the aqueous solution, in the reaction vessel. It may be washed with water and be employed direct for further reactions; for example be transformed with aqueous ammonia into pure p-toluene-sulfonamide which is valuable for the preparation of antidiabetics.

To assess the pure yield in p-toluenesulfochloride, the raw product is taken up moist in methylene chloride, is washed, dried and distilled in vacuo. Subsequently the solidification point of the distillate is determined indicative of the portion of o- and m-isomers present in the p-toluenesulfochloride (cf. Ber. 44, 2504 (1911)). The assessment can likewise be made by gas chromatography. The instant process enables a higher yield in p-toluenesulfochloride than is obtained according to the known processes.

The following Examples serve to illustrate the invention. The parts and percentages are by weight unless otherwise stated.

EXAMPLE 1

Into a 1 l content, 4-necked flask equipped with a stirrer, a thermometer, a dropping funnel, a gas-delivery tube, a heating and a cooling bath, 176 g (1.5 mols) of chlorosulfonic acid were admitted to which 24 g (0.45 mol) of ammonium chloride were portionwise added. In doing so, hydrogen chloride escaped and the solution warmed to about 50° C. Thereupon, at 80° C, 92.1 g (1 mol) of toluene were dropwise added within 2 – 3 hours. Subsequently, the batch was cooled to about 35° C and 176 g (1.5 mols) of chlorosulfonic acid were introduced within 5 to 10 minutes. The whole was stirred at the said temperature for one hour and the reaction mixture poured onto iced water. To determine the yield, the p-toluene-sulfochloride formed was taken up in methylene chloride, was washed, dried and distilled in vacuo. Besides 2 g of residue from distillation 161 g of p- toluenesulfochloride were obtained (corresponding to 84 – 85 percent of the theory) having a solidification point of 62° C. The portion of para-compound thus amounted to 90 percent, the theoretical yield in para-compound to 77 percent.

EXAMPLE 2

Into the reaction vessel 199 g (1.7 mols) of chlorosulfonic acid were admitted and 27 g (0.5 mol) of ammonium chloride added thereto with stirring. Thereupon, at 80° – 85° C 92.1 g of toluene were dropwise added and, subsequently thereto, at 35° C, 152 g (1.3 mols) of chlorosulfonic acid were allowed to run into the mixture.

Work-up was effected as in Example 1. It yielded 152 g (80 percent of the theory) of p-toluenesulfochloride whose solidification point was 62.5° C. The portion of para compound amounted to 90 – 92 percent, the theoretical yield thereof to 72 – 74 percent.

The following table lists further examples wherein 1 mol of toluene was reacted with 3 mols of chlorosulfonic acid and in which 1.5 mol always of chlorosulfonic acid was used.

| reac-salt in mols | reaction temp. in °C | pure yield in % of the theory | solidification point in °C | portion of p-toluene-sulfochloride in per cent |
|---|---|---|---|---|
| | | | | about |
| 0.25 Na$_2$SO$_4$ | 65 | 78.3 | 61 | " 88 |
| 0.2 Na$_2$SO$_4$ | 75 | 70.4 | 62.5 | 90–92 |
| 0.45 NaCl | 70 | 80 | 60 | " 86 |
| 0.2 K$_2$SO$_4$ | 70 | 83.5 | 61 | " 88 |
| 0.2 K$_2$SO$_4$ | 80 | " 77 | 62 | 89–91 |
| 0.4 KCl | 70 | 83 | 61 | " 88 |
| 0.4 KCl | 80 | 83 | 61.5 | 88–89 |
| 0.4 KCl | 90 | 78.5 | 62 | 89–91 |
| 0.2 (NH$_4$)$_2$SO$_4$ | 70 | 81.7 | 61 | " 88 |
| 0.14 Na$_2$SO$_4$ <br> 0.19 NH$_4$Cl | 75 | 80 | 62 | 89–91 |

We claim:

1. In the process for the preparation of p-toluenesulfochloride by reacting toluene with chlorosulfonic acid in the presence of salts, the improvement which consists essentially of introducing for each mol of toluene about 1– 2 mols of chlorosulfonic acid along with about 0.1 – 1 mol of an alkali metal or ammonium salt into a reaction vessel, adding toluene thereto, reacting the mixture at 60° – 90° C, cooling the mixture to 30° – 40° C, adding further chlorosulfonic acid in an amount between about 2 and 1 mols and completing the reaction to form p-toluenesulfochloride.

2. The process as claimed in claim 1, wherein in the first step about 1.5 mols of chlorosulfonic acid are used.

3. The process as claimed in claim 1, wherein in the second step about 1.5 mols of chlorosulfonic acid are used.

4. The process as claimed in claim 1, wherein potassium, sodium or ammonium sulfate or chloride or mixtures thereof are used as salts.

* * * * *